United States Patent
Madhavan et al.

(10) Patent No.: US 10,678,734 B2
(45) Date of Patent: Jun. 9, 2020

(54) COMMUNICATION SYSTEM FOR CONTROLLING OR MONITORING VEHICLE COMPONENTS

(71) Applicant: General Electric Company, Schenectady, NY (US)

(72) Inventors: Sethu Madhavan, Erie, PA (US); Dattaraj Jagdish Rao, Bangalore (IN); Fang Zhou Chen, Erie, PA (US); Arunachala Karthik Sridharan, Bangalore (IN); Dinesh Balaraman Thilla, Bangalore (IN); Prabhu Marimuthu, Chennai (IN)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 256 days.

(21) Appl. No.: 15/218,529

(22) Filed: Jul. 25, 2016

(65) Prior Publication Data
US 2018/0025556 A1    Jan. 25, 2018

(51) Int. Cl.
| | |
|---|---|
| *G06F 21/12* | (2013.01) |
| *G06F 13/40* | (2006.01) |
| *G06F 21/60* | (2013.01) |
| *G07C 5/00* | (2006.01) |
| *G06F 21/44* | (2013.01) |
| *G07C 5/08* | (2006.01) |
| *G06F 3/06* | (2006.01) |
| *G06F 21/31* | (2013.01) |

(52) U.S. Cl.
CPC ........ *G06F 13/4027* (2013.01); *G06F 3/0637* (2013.01); *G06F 21/121* (2013.01); *G06F 21/31* (2013.01); *G06F 21/44* (2013.01); *G06F 21/606* (2013.01); *G07C 5/008* (2013.01); *G07C 5/0825* (2013.01)

(58) Field of Classification Search
CPC ....... H04W 4/40; H04W 12/06; H04W 12/08; G06F 21/31; G06F 21/121; G06F 21/606; G06F 21/00; G06F 21/629; G06F 3/0637; G06F 3/0484
See application file for complete search history.

(56) References Cited

U.S. PATENT DOCUMENTS

2014/0309870 A1* 10/2014 Ricci ...................... H04W 4/21
701/36

* cited by examiner

*Primary Examiner* — Ernest Unelus
(74) *Attorney, Agent, or Firm* — Buckley, Maschoff & Talwalkar LLC

(57) ABSTRACT

A controller may receive interface information, associated with one or more interfaces used to communicate with one or more components of a vehicle, and may receive application information associated with one or more applications configured to receive information from the one or more components via the one or more interfaces. The controller may store, based on the interface information and the application information, registration information that indicates whether the one or more applications are permitted to communicate via the one or more interfaces. The controller may receive, from an application of the one or more applications, a request for vehicle information from an interface of the one or more interfaces. The controller may verify whether the application is permitted to communicate via the interface, and may selectively route the request for the vehicle information to the interface based on verifying whether the application is permitted to communicate via the interface.

19 Claims, 5 Drawing Sheets

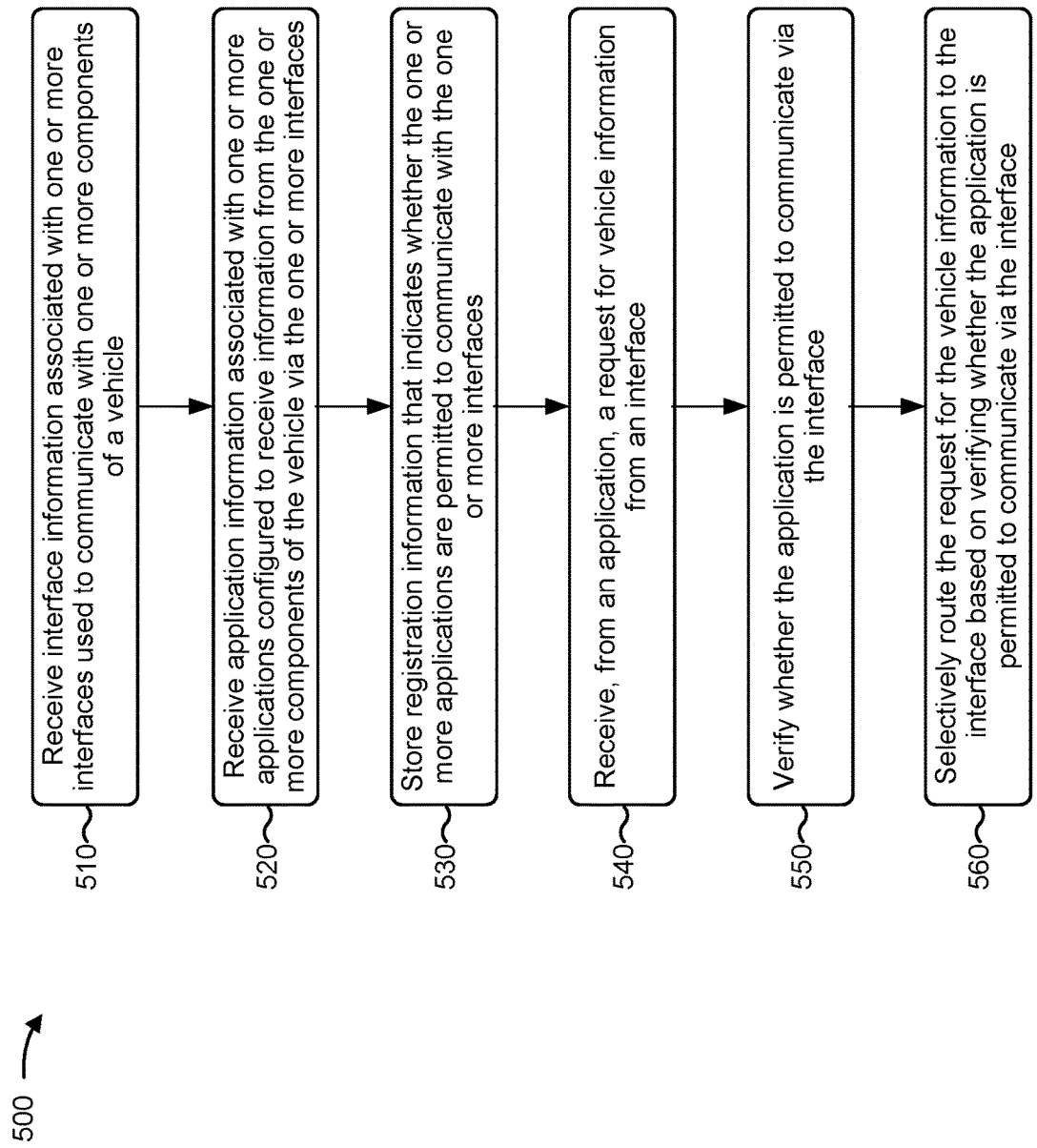

COMMUNICATION SYSTEM FOR CONTROLLING OR MONITORING VEHICLE COMPONENTS

TECHNICAL FIELD

Implementations described herein relate to a communication system for vehicles that permits applications to communicate with interfaces for controlling or monitoring vehicle components.

BACKGROUND

A vehicle, such as a train, a railcar, or a locomotive, includes various components that can be controlled and/or monitored (e.g., via actuators or sensors). For example, a vehicle may include an engine, a brake system, a fuel tender, a safety valve, a steam collector, a smoke box, a boiler, a heater, or the like.

BRIEF DESCRIPTION

According to some possible implementations, a system may include a controller configured to receive interface information associated with one or more interfaces used to communicate with one or more components of a vehicle. The controller may be configured to receive application information associated with one or more applications configured to receive information from the one or more components of the vehicle via the one or more interfaces. The controller may be configured to store, based on the interface information and the application information, registration information that indicates whether the one or more applications are permitted to communicate via the one or more interfaces. The controller may be configured to receive, from an application of the one or more applications, a request for vehicle information from an interface of the one or more interfaces. The controller may be configured to verify whether the application is permitted to communicate via the interface, and to selectively route the request for the vehicle information to the interface based on verifying whether the application is permitted to communicate via the interface.

According to some possible implementations, a non-transitory computer-readable medium may store one or more instructions that, when executed by one or more processors, cause the one or more processors to store registration information that indicates whether an application, of one or more applications, is permitted to communicate via an interface of one or more interfaces. The one or more interfaces may be configured to be used to communicate with one or more sensors of a vehicle. The one or more applications may be configured to request information from the one or more sensors of the vehicle via the one or more interfaces. The one or more instructions may cause the one or more processors to receive, from the application, a request for vehicle information from a sensor of the one or more sensors. The one or more instructions may cause the one or more processors to verify, based on the registration information, whether the application is permitted to communicate via an interface, of the one or more interfaces, associated with the sensor. The one or more instructions may cause the one or more processors to selectively provide the request for the vehicle information to the interface based on verifying whether the application is permitted to communicate via the interface.

According to some possible implementations, a method may include receiving, by a device, interface information associated with a plurality of interfaces used to communicate with a plurality of components of a vehicle. The method may include receiving, by the device, application information associated with a plurality of applications configured to request information from at least one component, of the plurality of components, via at least one interface of the plurality of interfaces. The method may include storing, by the device and based on the interface information and the application information, registration information that indicates whether an application, of the plurality of applications, is permitted to communicate via one or more of the plurality of interfaces. The method may include receiving, by the device and from the application, a request for vehicle information from a component of the plurality of components. The method may include verifying, by the device and based on the registration information, whether the application is permitted to communicate via an interface, of the plurality of interfaces, associated with the component. The method may include selectively providing, by the device, the request for the vehicle information to the interface based on verifying whether the application is permitted to communicate via the interface.

BRIEF DESCRIPTION OF THE DRAWINGS

FIG. 5 is a flow chart of an example process for controlling or monitoring vehicle components using a communication system.

DETAILED DESCRIPTION

The following detailed description of example implementations refers to the accompanying drawings. The same reference numbers in different drawings may identify the same or similar elements.

Vehicle communication systems may integrate vehicle components and interfaces with applications that communicate with the vehicle components via the interfaces. For example, a vehicle may include an engine monitoring application to communicate with an engine system via an engine sensor interface. When these vehicle components become obsolete, code may need to be rewritten for communication between new components, interfaces, and applications, thereby increasing development and deployment costs. Further, such code may not be portable, modular, and/or reusable when the vehicle components, interfaces, and/or applications are integrated.

Implementations described herein include a vehicle communication system that permits reuse of code and automatic management of communications between vehicle components and applications via interfaces. The applications, interfaces, and other components of the vehicle communication system (e.g., code associated with these components) may be modular (e.g., separate) to permit code reuse, code portability, and code flexibility in a hardware-agnostic communication system. Furthermore, implementations described herein may permit communication between an application and an interface based on compatibility between the application and the interface. As a result, fewer errors occur during communication, and time is saved due to code reuse. Further, implementations described herein provide a scalable communication architecture, automatic configuration of communications between applications and interfaces, flexible use for different vehicle components and component configurations, and functionality across multiple operating systems. Further, implementations described herein improve the security of vehicle communications. For example, implementations described herein may prevent an application from controlling or monitoring a vehicle component to which the application has not been granted permission to access (e.g., prevent an engine monitoring application from controlling or monitoring a brake system).

Figure 1:
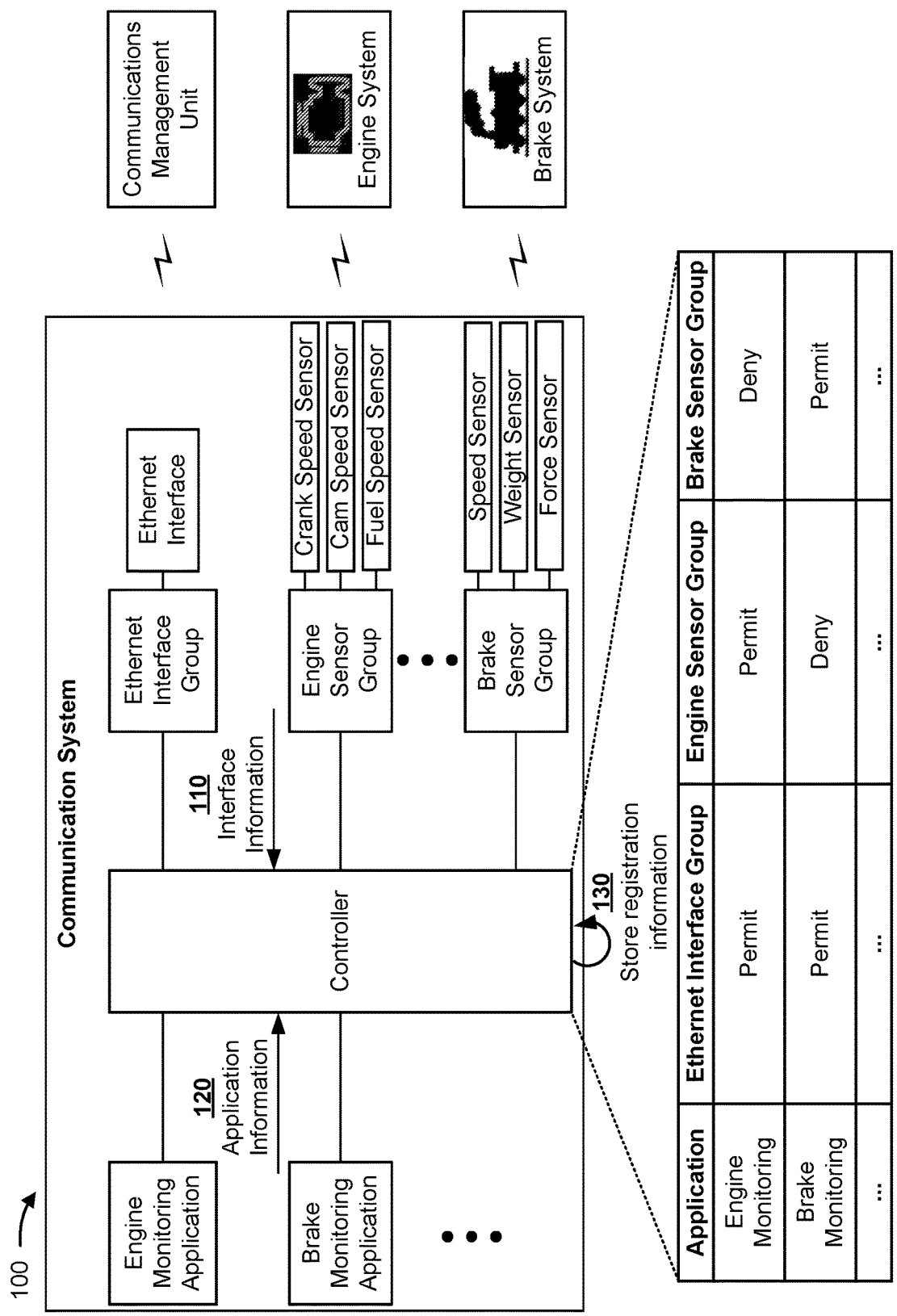
FIGS. 1-3 are diagrams of an overview of an example implementation described herein.
Figure 2:
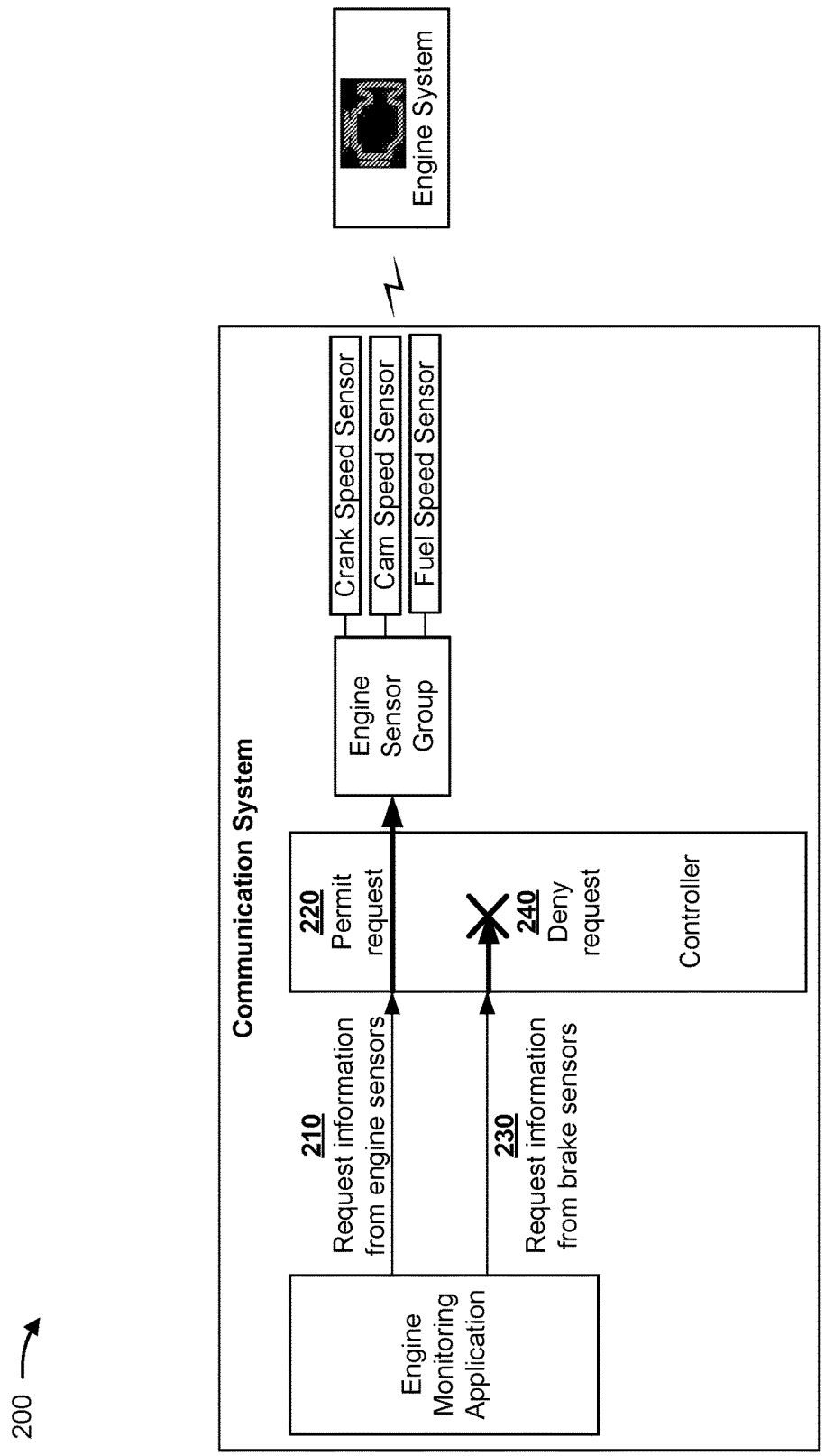
Figure 3:
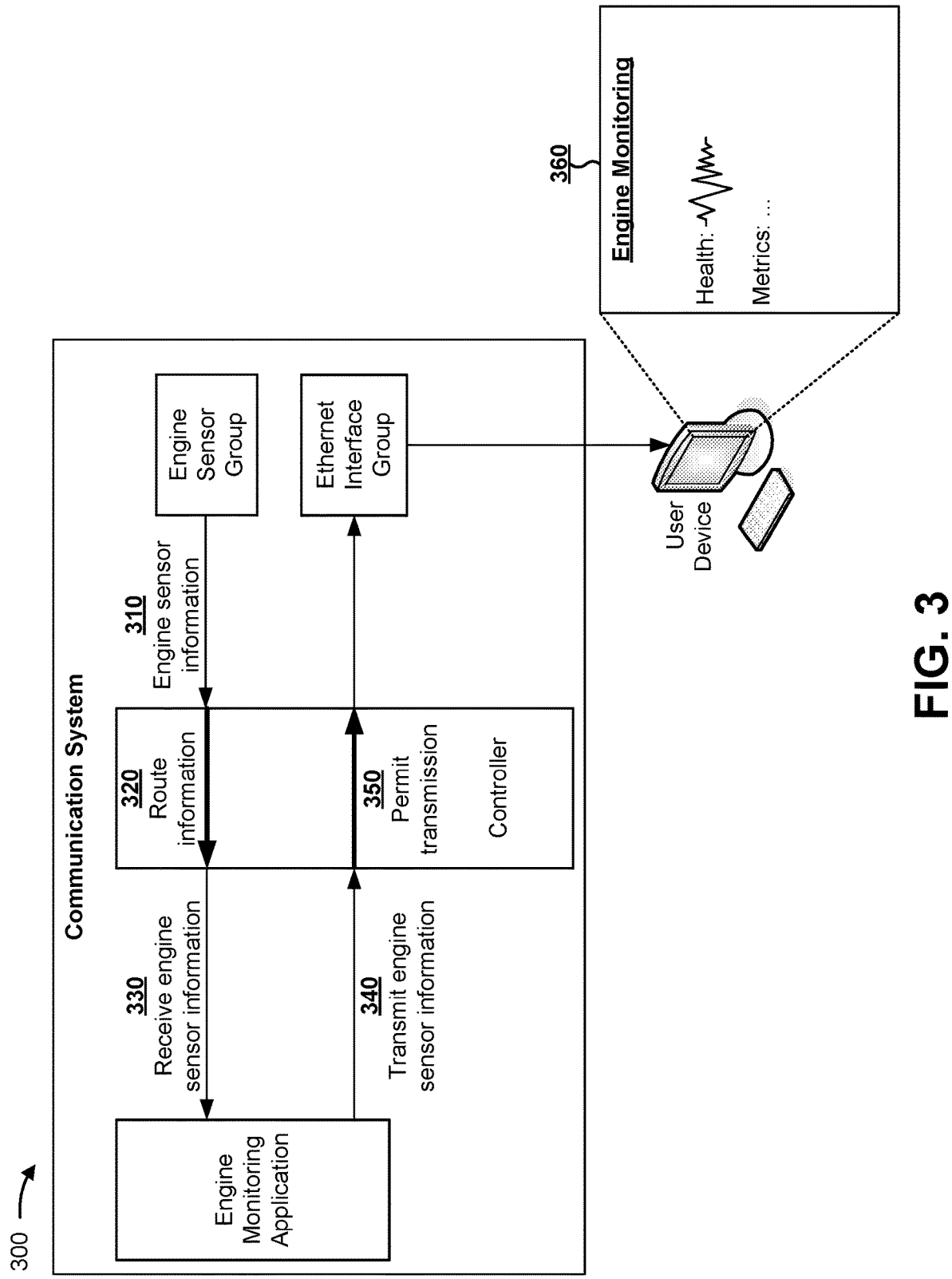

FIGS. 1, 2, and 3 are diagrams of an overview of example implementations 100, 200, and 300 described herein. As shown in FIG. 1, a communication system of a vehicle may include multiple components, such as a controller, one or more applications, and one or more interface groups associated with one or more interfaces. For example, the communication system shown in FIG. 1 includes an engine monitoring application, a brake monitoring application, an Ethernet interface group associated with an Ethernet interface, an engine sensor group associated with a crank speed sensor, a cam speed sensor, and a fuel speed sensor, and a brake sensor group associated with a speed sensor, a weight sensor, and a force sensor. The communication system may implement these components as modular components, such that the communication system can be customized and scalable to coordinate communication between different applications, interface groups, interfaces, and vehicle components.

As shown by reference number 110, the controller may receive interface information from one or more interfaces associated with the communication system. For example, the controller may receive interface information from the Ethernet interface group, the engine sensor group, and the brake sensor group. In some implementations, the interface information may include an interface identifier, compatibility information (e.g., a format for information capable of being transmitted via and/or received from the interface), information that identifies a vehicle component for which the interface provides communication capability, or the like. In some implementations, the interface information may include access permission information identifying which applications are allowed to communicate with particular vehicle components via the interface(s). As an example, the interface information may include access permission information indicating that an engine monitoring application is allowed to communicate with an engine system via the engine sensor group, but is not allowed to communicate with a brake system via the brake sensor group.

As shown by reference number 120, the controller may receive application information from one or more applications for monitoring or controlling the vehicle components via the interface(s). For example, the controller may receive the application information from an engine monitoring application, a brake monitoring application, and/or another type of application associated with the vehicle. In some implementations, the application information may include an application identifier and/or compatibility information (e.g., types of interfaces with which the application is compatible, a format for information that the application is able to receive and transmit, and/or other compatibility information).

As shown by reference number 130, the controller may store registration information that identifies applications and interfaces via which the applications are permitted to communicate. In some implementations, the registration information may be based on compatibility information and/or access permission information. For example, the registration information may indicate that a particular application may communicate via a particular interface when the particular application is compatible with the particular interface and when the access permission information indicates that the particular application is allowed to communicate via the particular interface.

As an example, assume that the engine monitoring application is compatible with the Ethernet interface group and the engine sensor group, but is not compatible with the brake sensor group. Further, assume that the engine monitoring application is allowed to communicate via the Ethernet interface group and the engine sensor group, but not via the brake sensor group (e.g., based on the access permission information). Thus, as shown in FIG. 1, the controller may store registration information indicating that the engine monitoring application is permitted to communicate via the Ethernet interface group and the engine sensor group, but is not permitted to communicate via the brake sensor group. Similarly, the controller may store registration information indicating that the brake monitoring application is permitted to communicate via the Ethernet interface group and the brake sensor group, but is not permitted to communicate via the engine sensor group.

As shown in FIG. 2, and by reference number 210, assume that the engine monitoring application requests information from engine sensors. As shown by reference number 220, the controller may permit this request because the registration information indicates that the engine monitoring application is permitted to communicate via the engine sensor group, and may permit the engine monitoring application to access the engine sensor group. As shown by reference number 230, assume that the engine monitoring application also requests information from brake sensors. As shown by reference number 240, the controller may deny this request because the registration information indicates that the engine monitoring application is not permitted to communicate via the brake sensor group.

As shown in FIG. 3, and by reference number 310, the engine sensor group may output engine sensor information. For example, the engine sensor group may output engine sensor information based on the controller permitting the request for the engine sensor information. As shown by reference number 320, the controller may route the engine sensor information to the engine monitoring application. As shown by reference number 330, the engine monitoring application may receive the engine sensor information. As shown by reference number 340, the engine monitoring application may request to transmit the engine sensor information, via the Ethernet interface group, to a user device. As shown by reference number 350, the controller may permit this transmission because the registration information indicates that the engine monitoring application is compatible with the Ethernet interface group and is allowed to communicate via the Ethernet interface group. As shown by reference number 360, the user device may receive and display the engine sensor information (e.g., in an engine monitoring application of the user device). In some implementations, the user device may be used to monitor the engine and/or control the engine based on the received engine sensor information.

In this way, the controller may manage communications between applications and vehicle components via one or more interfaces. The controller may store registration information indicating whether a particular application may communicate with a particular vehicle component via a particular interface based on the compatibility between the application and the interface and/or based on access permission information. As a result, errors in communication between applications and interfaces may be reduced, and security policies may be implemented and/or updated without the need to update the underlying code within an application and/or the communication system. Further, communications between an application and an updated or new vehicle component may occur without the need to rewrite code and/or redeploy the application. Similarly, communications between an updated or new application and a vehicle component may occur without the need to update the vehicle component.

Furthermore, by utilizing modular components, the communication system can be easily modified to add a new application (e.g., to permit an application to communicate via one or more interfaces and/or interface groups), to remove an application (e.g., to prevent an application from communicating via one or more interfaces and/or interface groups), or to modify applications (e.g., to modify interface groups and/or interfaces via which an application is permitted to communicate). Similarly, the communication system can be easily modified to add a new interface and/or an interface group, to remove an interface and/or an interface group, or to modify an interface and/or an interface group. In this way, when vehicle components are added, removed, or modified, the communication system can be easily modified to support such changes to the vehicle components.

As indicated above, FIGS. 1, 2, and 3 are provided merely as examples. Other examples are possible and may differ from what was described with regard to FIGS. 1, 2, and 3.

Figure 4:
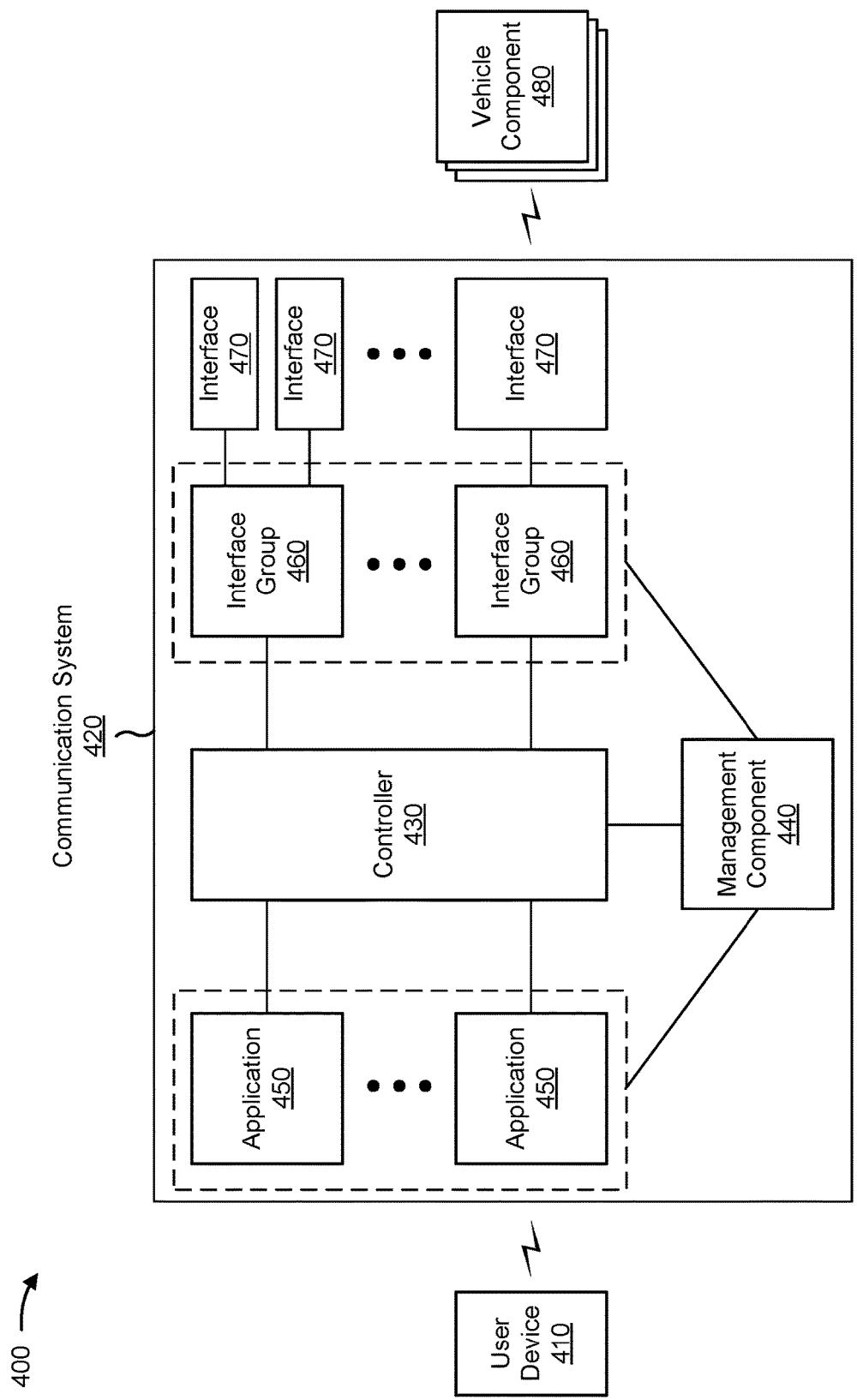
FIG. 4 is a diagram of an example environment in which systems and/or methods, described herein, may be implemented.

FIG. 4 is a diagram of an example of an environment 400 in which systems and/or methods, described herein, may be implemented. As shown in FIG. 4, the environment 400 may include a user device 410, a communication system 420, a controller 430, a management component 440, an application 450, an interface group 460, an interface 470, and a vehicle component 480. Devices of the environment 400 may interconnect via wired connections, wireless connections, or a combination of wired and wireless connections.

User device 410 includes one or more devices capable of communicating with communication system 420. For example, user device 410 may include an on-board vehicle computer, a desktop computer, a laptop computer, a server device, a mobile phone, or the like. In some implementations, user device 410 may provide application information to install and/or register application 450 with communication system 420. Additionally, or alternatively, user device 410 may execute application 450 to send information to or receive information from vehicle component 480. In some implementations, user device 410 may be integrated into a vehicle and/or used to monitor or control one or more vehicle components 480.

Communication system 420 includes one or more devices capable of facilitating communication between one or more applications 450 and one or more vehicle components 480 via one or more interfaces 470. For example, communication system 420 may include one or more processors, an assimilator card, an integrated circuit, or the like. In some implementations, communication system 420 includes a processor implemented in hardware, firmware, or a combination of hardware and software. For example, the processor may include a central processing unit (CPU), a graphics processing unit (GPU), an accelerated processing unit (APU)), a microprocessor, a microcontroller, and/or any processing component (e.g., a field-programmable gate array (FPGA) and/or an application-specific integrated circuit (ASIC)) that interprets and/or executes instructions.

Additionally, or alternatively, communication system 420 may include a memory, such as a random access memory (RAM), a read only memory (ROM), and/or another type of dynamic or static storage device (e.g., a flash memory, a magnetic memory, and/or an optical memory) that stores information and/or instructions for use by a processor. Additionally, or alternatively, communication system 420 may include one or more storage components, one or more input components, one or more output components, and/or one or more communication interfaces.

Communication system 420 may perform one or more processes described herein. Communication system 420 may perform these processes in response to a processor executing software instructions stored by a non-transitory computer-readable medium, such as a memory and/or a storage component. A computer-readable medium is defined herein as a non-transitory memory device. A memory device includes memory space within a single physical storage device or memory space spread across multiple physical storage devices. Software instructions may be read into the memory and/or the storage component from another computer-readable medium or from another device via a communication interface. When executed, software instructions stored in the memory and/or the storage component may cause the processor to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

As shown, communication system 420 may include controller 430, management component 440, application 450, interface group 460, and/or interface 470. In some implementations, one or more of these components may be integrated into communication system 420. In some implementations, one or more of these components may be external to communication system 420. In some implementations, components of communication system 420 may communicate using an application programming interface (e.g., controller 430 and application 450, controller 430 and interface group 460, controller 430 and interface 470, or interface group 460 and interface 470).

Controller 430 includes one or more components capable of facilitating communication between applications 450 and interfaces 470. For example, controller 430 may include an integrated circuit, one or more processors, or the like. In some implementations, controller 430 may control and/or transfer communications between applications 450 and interfaces 470, as described in more detail elsewhere herein.

Management component 440 includes one or more components capable of performing management functions for communications system 420, such as resource management (e.g., management of memory and/or processing resources), boot management, or the like. For example, management component 440 may include an integrated circuit, one or more processors, or the like. In some implementations, controller 430 and management component 440 may be integrated into a single component.

Application 450 includes an application for receiving information from and/or sending information to vehicle component 480. In some implementations, application 450 may be used to monitor and/or control vehicle component 480. Additionally, or alternatively, application 450 may receive input from user device 410 for monitoring and/or controlling vehicle component 480. In some implementations, application 450 may output vehicle information to user device 410 based on information received from vehicle component 480.

Interface group 460 includes one or more components capable of facilitating communications between application 450 and interface 470. In some implementations, interface group 460 may store information for communicating with one or more interfaces 470. In some implementations, interface group 460 may be configurable to permit communication between different types of interfaces 470. Additionally, or alternatively, interface group 460 may interface with, may activate, and/or may validate interfaces 470.

Interface 470 includes one or more components that provide an interface for communicating with vehicle component(s) 480. For example, interface 470 may include a serial interface (e.g., RS232 or RS422), a network interface (e.g., Ethernet interface, a coaxial interface), a wireless interface (e.g., cellular interface, such as a code division multiple access (CDMA) interface or a Global System of Mobile Communications (GSM) interface; a WiFi interface; a personal area network interface, such as an 802.15 interface), a controller area network (CAN) interface (e.g., a vehicle bus), a sensor interface, or the like. In some implementations, interface 470 may be a device driver for vehicle component 480.

Vehicle component 480 includes one or more components of a vehicle. For example, a vehicle may include a locomotive, a railcar, a train, a mining vehicle, a marine vehicle, a land vehicle, a passenger vehicle, or the like. In some implementations, vehicle component 480 may include an engine, a boiler, a generator, a brake system (e.g., an air pump, a brake shoe, etc.), one or more lights, one or more valves, one or more actuators, or the like. Additionally, or alternatively, vehicle component 480 may include one or more sensors, such as a position sensor, a speed sensor, an acceleration sensor, a temperature sensor, a pressure sensor, a weight sensor, or the like. In some implementations, vehicle component 480 (e.g., a sensor of vehicle component 480) may output information to application 450 via interface 470. Additionally, or alternatively, application 450 may provide an instruction to an actuator of vehicle component 480 to control vehicle component 480.

The number and arrangement of devices and networks shown in FIG. 4 are provided as an example. In practice, there may be additional devices, fewer devices, different devices, or differently arranged devices than those shown in FIG. 4. Furthermore, two or more devices shown in FIG. 4 may be implemented within a single device, or a single device shown in FIG. 4 may be implemented as multiple, distributed devices. Additionally, or alternatively, a set of devices (e.g., one or more devices) of environment 400 may perform one or more functions described as being performed by another set of devices of environment 400. In some implementations, user device 410, controller 430, management component 440, application 450, interface group 460, interface 470, and/or vehicle component 480 may interact using pre-defined APIs.

FIG. 5 is a flow chart of an example process 500 for controlling or monitoring vehicle components using a communication system. In some implementations, one or more process blocks of FIG. 5 may be performed by communication system 420. In some implementations, one or more process blocks of FIG. 5 may be performed by another device or a group of devices separate from or including communication system 420, such as user device 410, controller 430, management component 440, application 450, interface group 460, interface 470, and/or vehicle component 480.

As shown in FIG. 5, process 500 may include receiving interface information associated with one or more interfaces used to communicate with one or more components of a vehicle (block 510). For example, controller 430 may receive interface information associated with interface 470. The interface information may include information that permits communication with vehicle component 480 via interface 470. For example, the interface information may include an interface identifier, an interface type identifier (e.g., information that indicates a type of interface 470), interface compatibility information (e.g., a format for information capable of being transmitted via and/or received from interface 470), information that identifies vehicle component(s) 480 for which interface 470 provides communication capability, or the like.

In some implementations, the interface information may include access permission information that indicates whether application 450 is allowed to communicate with vehicle component(s) 480 via interface 470. For example, the access permission information may indicate whether any applications 450 are permitted to communicate with vehicle component(s) 480 via interface 470. As another example, the access permission information may identify one or more types of applications 450 permitted to communicate with or prevented from communicating with vehicle component(s) 480 via interface 470. For example, the interface information may indicate that engine monitoring application types may communicate via engine sensor group interface types, but may not communicate via brake sensor group interface types. As another example, the access permission information may identify one or more particular applications 450 permitted to communicate with or prevented from communicating with vehicle component(s) 480 via interface 470. As another example, the access permission information may identify one or more entities (e.g., application owners or creators) whose applications 450 are permitted to communicate with or prevented from communicating with vehicle component(s) 480 via interface 470.

While some implementations are described herein in connection with interfaces 470, some implementations may apply to interface groups 460, which may include one or more interfaces 470. For example, interface information may be received from an engine sensor group, a brake sensor group, a valve sensor group, or the like, and may indicate which application 450 is allowed to communicate with vehicle component(s) 480 via interface group 460.

As further shown in FIG. 5, process 500 may include receiving application information associated with one or more applications configured to receive information from the one or more components of the vehicle via the one or more interfaces (block 520). For example, controller 430 may receive application information associated with application 450. In some implementations, the application information may include information for facilitating communication with application 450. For example, the application information may indicate an application identifier, a type of application, an entity associated with the application (e.g., an application owner, an application creator), compatibility information (e.g., information that indicates a format for information capable of being received from and/or provided to application 450), and/or other information regarding application 450.

In some implementations, the application information may include information that identifies vehicle component (s) 480, interface(s) 470, and/or interface group(s) 460 for which application 450 is requesting permission to communicate. Additionally, or alternatively, the application information may include operating requirements of application 450, such as memory access requirements, processing requirements, or the like. In some implementations, controller 430 may not permit use of application 450 (e.g., may not install application 450) if the operating requirements of application 450 do not comply with predefined criteria (e.g., memory and/or processor usage). In some implementations, controller 430 may also provide an indication of a failure to install an application 450 (e.g., to user device 410). Additionally, or alternatively, controller 430 may test communications between application 450 and interface 470. If communications fail, controller 430 may remove and/or uninstall application 450, and may provide an indication of the communication failure (e.g., to user device 410).

As further shown in FIG. 5, process 500 may include storing registration information that indicates whether the one or more applications are permitted to communicate with the one or more interfaces (block 530). For example, controller 430 may store registration information that indicates whether the one or more applications 450 are permitted to communicate with one or more interfaces 470. In some implementations, controller 430 may use the application information and/or the interface information to determine the registration information. For example, controller 430 may determine whether a particular application 450 is permitted to communicate via a particular interface 470 based on compatibility information (e.g., that indicates a compatibility between application 450 and interface 470 and/or interface group 460) and/or based on access permission information. For example, controller 430 may determine whether application 450 is compatible with interface 470 based on the format of data that application 450 and interface 470 are capable of transmitting and receiving. In some implementations, controller 430 may store registration information indicating that an application 450 may communicate via an interface 470 when the application 450 is compatible with the interface 470 and when the access permission information indicates that the application 450 is allowed to communicate via the interface 470.

As an example, controller 430 may determine whether application 450 has permission to access interface 470 based on the type of application 450 and stored access permission information indicating the types of applications 450 permitted to access interface 470. As another example, controller 430 may determine whether application 450 has permission to access interface 470 based on an identifier of application 450 and stored access permission information indicating the application identifiers for applications 450 permitted to access interface 470. As another example, controller 430 may determine whether application 450 has permission to access interface 470 based on an entity associated with application 450 and stored access permission information identifying entities for applications 450 permitted to access interface 470. As another example, controller 430 may determine whether application 450 has permission to access interface 470 based on a global indicator of whether any applications 450 are permitted to access interface 470.

In some implementations, controller 430 may determine the registration information for one or more interfaces 470 per application 450. Additionally, or alternatively, controller 430 may determine the registration information for multiple applications 450. Additionally, or alternatively, controller 430 may determine the registration information for an interface group 460. In this case, if the registration information indicates that application 450 is permitted to communicate with interface group 460, then application 450 may be permitted to communicate with all interfaces 470 included in interface group 460.

In some implementations, controller 430 may store information that indicates a relationship between vehicle component 480 and interface(s) 470 (and/or interface groups 460) for communicating with vehicle component 480. Controller 430 may use the stored relationship information to determine whether application 450 is permitted to access vehicle component 480 (e.g., via interface(s) 470). For example, if application 450 requests permission to access vehicle component 480, then controller 430 may determine interfaces 470 used to communicate with vehicle component 480, and may determine whether application 450 is permitted to communicate with vehicle component 480 based on whether application 450 is permitted to communicate with interface 470 associated with vehicle component 480.

In some implementations, controller 430 may store the registration information in a data structure that identifies application 450 and whether to permit or deny communications between application 450 and one or more interfaces 470 identified by interface identifier(s). In some implementations, controller 430 may store registration information as new applications 450 are added (e.g., installed or requested to be installed) and/or as new application information is received. Additionally, or alternatively, controller 430 may store registration information as new interfaces 470 and/or interface groups 460 are added (e.g., installed or requested to be installed) and/or as new interface information is received.

In some implementations, controller 430 may load application information, may load interface information, and/or may store registration information upon boot-up. For example, executables for applications 450, interface groups 460, and/or interfaces 470 may be stored by communication system 420. Upon startup, management component 440 may execute the executables to register applications 450, interface groups 460, and/or interfaces 470. In some implementations, controller 430 may store and/or replace executables and may reboot to reregister applications 450, interface groups 460, and/or interfaces 470 when new applications 450, interface groups 460, and/or interfaces 470 are installed or updated. In this way, controller 430 may automatically configure communications between applications 450 and interfaces 470, may easily add new applications 450 and interfaces 470, and may easily update new applications 450 and interfaces 470. Furthermore, controller 430 may conserve processing resources.

As further shown in FIG. 5, process 500 may include receiving, from an application, a request for vehicle information from an interface (block 540), and verifying whether the application is permitted to communicate via the interface (block 550). For example, controller 430 may receive a request for vehicle information from application 450. In some implementations, controller 430 may identify application 450 from which the request is received (e.g., based on an identifier of the application 450). Controller 430 may identify an interface 470 from which vehicle information is to be obtained. In some implementations, controller 430 may identify the interface 470 based on a type of vehicle information requested and the interface 470 associated with the requested type of vehicle information. Additionally, or alternatively, the interface 470 may be explicitly identified in the request. Additionally, or alternatively, an interface group 460 and/or vehicle component 480 may be identified in the request, and controller 430 may identify interface 470 based on the interface group 460 and/or vehicle component 480.

In some implementations, controller 430 may verify whether the application 450 is permitted to communicate with the interface 470 based on the stored registration information. For example, controller 430 may look up application 450, using the registration information, to determine whether application 450 has permission to access interface 470.

As further shown in FIG. 5, process 500 may include selectively routing the request for the vehicle information to the interface based on verifying whether the application is permitted to communicate via the interface (block 560). For example, controller 430 may provide the request to interface 470 if application 450 is permitted to access interface 470 (e.g., based on the registration information). If application 450 is not permitted to communicate with interface 470, then controller 430 may drop and/or discard the request. In some implementations, controller 430 may notify application 450 that the permission has been denied. In some implementations, controller 430 may send the notification that the permission has been denied to user device 410.

In some implementations, controller 430 may receive a response, to the request, from interface 470. Controller 430 may provide the response to application 450. In some implementations, controller 430 may verify whether application 450 is permitted to receive the response (e.g., based on the registration information). In this way, controller 430 may provide additional security for communications between application 450 and vehicle components 480. As described herein, controller 430 may increase security of communications between applications 450 and vehicle components 480 while providing a flexible, scalable architecture for communicating with vehicle components 480.

In some implementations, application 450 may use the response to monitor vehicle component 480. For example, application 450 may provide vehicle information for display (e.g., via user device 410). The vehicle information may include information sensed by vehicle component 480 and/or a sensor of vehicle component 480, and may be used by an operator and/or by user device 410 to control operation of vehicle component 480. In some implementations, application 450 may use the response to determine whether to control vehicle component 480 and/or a manner in which vehicle component 480 is to be controlled. For example, application 450 may compare vehicle information to a threshold and/or a condition, and may control vehicle component 480 when the threshold and/or condition is satisfied. In some implementations, application 450 may control vehicle component 480 by starting up vehicle component 480, shutting down vehicle component 480, restarting or rebooting vehicle component 480, providing an instruction to vehicle component 480 to modify an operating parameter of vehicle component 480, or the like.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

As described above, a controller may manage communications between an application and a vehicle component via an interface. The controller may store registration information indicating whether a particular application may communicate with a particular vehicle component via a particular interface based on compatibility between the application and the interface and/or based on access permission information. In this way, as modular components (e.g., applications, interfaces, and/or interface groups) of the communication system are added, removed, or modified, the controller can maintain a high level of security for communications with vehicle components. Furthermore, errors in communication between applications and interfaces may be reduced, and access permission information may be implemented and/or updated without the need to update the underlying code for the application, the interface, or the vehicle component. Further, communications between an application and an updated vehicle component may occur without the need to rewrite and/or redeploy the application. Furthermore, implementations described herein may conserve computing resources via automatic configuration of communications between applications and interfaces.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, and/or a combination of hardware and software.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related items, and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A system, comprising:
    a controller configured to:
        receive interface information associated with a plurality of interfaces used to communicate with a plurality of components of a vehicle, the interface information including access permission information identifying which of a plurality of applications are allowed to communicate with respective ones of the plurality of components via the plurality of interfaces;
        receive application information associated with the plurality of applications configured to receive information from the plurality of components of the vehicle via the plurality of interfaces;
        store, based on the interface information and the application information, registration information that indicates whether the plurality of applications are permitted to communicate via the plurality of interfaces;

receive, from an application of the plurality of applications, a request for vehicle information from an interface of the plurality of interfaces;
verify whether the application is permitted to communicate via the interface; and
selectively route the request for the vehicle information to the interface based on verifying whether the application is permitted to communicate via the interface;
wherein the plurality of applications include an engine monitoring application and the controller is further configured to permit a first request for information, said first request for information being from the engine monitoring application and being for requesting information from at least one engine sensor; the controller further configured to deny a second request for information, said second request for information being from the engine monitoring application and being for requesting information from at least one brake sensor.

2. The system of claim 1, where the controller, when verifying whether the application is permitted to communicate via the interface, is configured to:
determine one or more application types permitted to communicate via the interface;
determine an application type of the application; and
verify whether the application is permitted to communicate via the interface based on the application type of the application and the one or more application types permitted to communicate via the interface.

3. The system of claim 1, where the controller, when verifying whether the application is permitted to communicate via the interface, is configured to:
determine one or more entities whose applications are permitted to communicate via the interface;
determine an entity associated with the application; and
verify whether the application is permitted to communicate via the interface based on the entity associated with the application and the one or more entities whose applications are permitted to communicate via the interface.

4. The system of claim 1, where the controller is configured to receive the interface information and the application information based on loading one or more executables.

5. The system of claim 1, where the plurality of applications are separate from the plurality of interfaces.

6. The system of claim 1, where the plurality of interfaces are separate from the plurality of components of the vehicle.

7. A non-transitory computer-readable medium storing instructions, the instructions comprising:
one or more instructions that, when executed by one or more processors, cause the one or more processors to:
store registration information that indicates whether an application, of a plurality of applications, is permitted to communicate via an interface of a plurality of interfaces, the registration information including interface information and application information, the interface information including access permission information identifying which of the plurality of applications are allowed to communicate with respective ones of a plurality of components via the plurality of interfaces,
the plurality of interfaces being configured to be used to communicate with a plurality of sensors of a vehicle,
the plurality of applications being configured to request information from the plurality of sensors of the vehicle via the plurality of interfaces;
receive, from the application, a request for vehicle information from a sensor of the plurality of sensors;
verify, based on the registration information, whether the application is permitted to communicate via an interface, of the plurality of interfaces, associated with the sensor; and
selectively provide the request for the vehicle information to the interface based on verifying whether the application is permitted to communicate via the interface;
wherein the plurality of applications include an engine monitoring application; the one or more instructions, when executed by the one or more processors, causing the one or more processors to:
permit a first request for information, said first request for information being from the engine monitoring application and being for requesting information from at least one engine sensor; and
deny a second request for information, said second request for information being from the engine monitoring application and being for requesting information from at least one brake sensor.

8. The non-transitory computer-readable medium of claim 7, where the registration information indicates whether the application is permitted to communicate with an interface group associated with the interface and associated with at least one other interface; and
where the one or more instructions, that cause the one or more processors to verify whether the application is permitted to communicate via the interface, cause the one or more processors to:
verify whether the application is permitted to communicate via the interface group.

9. The non-transitory computer-readable medium of claim 7, where the interface is included in an interface group that includes a plurality of interfaces; and
where the one or more instructions, that cause the one or more processors to selectively provide the request for the vehicle information to the interface, cause the one or more processors to:
selectively provide the request for the vehicle information to the interface group.

10. The non-transitory computer-readable medium of claim 7, where the one or more instructions, when executed by the one or more processors, further cause the one or more processors to:
receive compatibility information that indicates whether communications of the application are compatible with the interface; and
where the one or more instructions, that cause the one or more processors to store the registration information, cause the one or more processors to:
store the registration information based on the compatibility information.

11. The non-transitory computer-readable medium of claim 7, where the one or more instructions, when executed by the one or more processors, further cause the one or more processors to:
determine whether one or more operating requirements, associated with the application, satisfy one or more criteria; and where the one or more instructions, that cause the one or more processors to store the registration information, cause the one or more processors to:
store the registration information based on determining whether the one or more operating requirements satisfy the one or more criteria.

12. The non-transitory computer-readable medium of claim 7, where the one or more instructions, that cause the one or more processors to verify whether the application is permitted to communicate via the interface, cause the one or more processors to:
determine an application identifier associated with the application; and
verify whether the application is permitted to communicate via the interface based on the application identifier.

13. The non-transitory computer-readable medium of claim 7, where the one or more instructions, that cause the one or more processors to verify whether the application is permitted to communicate via the interface, cause the one or more processors to:
verify whether the application is permitted to communicate via the interface based on a global indicator that indicates whether any applications are permitted to access the interface.

14. A method, comprising:
receiving, by a device, interface information associated with a plurality of interfaces used to communicate with a plurality of components of a vehicle, the interface information including access permission information identifying one or more applications of a plurality of applications that are allowed to communicate with respective ones of the plurality of components via one or more of the plurality of interfaces;
receiving, by the device, application information associated with the plurality of applications configured to request information from at least one component, of the plurality of components, via at least one interface of the plurality of interfaces;
storing, by the device and based on the interface information and the application information, registration information that indicates whether an application, of the plurality of applications, is permitted to communicate via one or more of the plurality of interfaces;
receiving, by the device and from the application, a request for vehicle information from a component of the plurality of components;
verifying, by the device and based on the registration information, whether the application is permitted to communicate via an interface, of the plurality of interfaces, associated with the component; and
selectively providing, by the device, the request for the vehicle information to the interface based on verifying whether the application is permitted to communicate via the interface;
wherein the plurality of applications include an engine monitoring application;
the method further comprising:
permitting, by the device, a first request for information, said first request for information being from the engine monitoring application and being for requesting information from at least one engine sensor; and
denying, by the device, a second request for information, said second request for information being from the engine monitoring application and being for requesting information from at least one brake sensor.

15. The method of claim 14, where the plurality of applications, the plurality of interfaces, and the plurality of components are separate.

16. The method of claim 14, where selectively providing the request comprises:
transmitting the request to the interface when the application is permitted to communicate via the interface; and
dropping the request when the application is not permitted to communicate via the interface.

17. The method of claim 14, where the registration information indicates whether communications of the application are compatible with communications of the interface.

18. The method of claim 14, where verifying whether the application is permitted to communicate via the interface comprises:
verifying whether the application is permitted to communicate via the interface based on at least one of:
an application identifier that identifies the application, or
a type of the application.

19. The method of claim 14, where at least two of the plurality of applications are associated with different operating systems.

* * * * *